(12) United States Patent
Gessling

(10) Patent No.: US 9,972,214 B2
(45) Date of Patent: May 15, 2018

(54) CHILD HYGIENE TRAINING DEVICE

(71) Applicant: Heather Gessling, Columbia, MO (US)

(72) Inventor: Heather Gessling, Columbia, MO (US)

( * ) Notice: Subject to any disclaimer, the term of this patent is extended or adjusted under 35 U.S.C. 154(b) by 269 days.

(21) Appl. No.: 14/881,655

(22) Filed: Oct. 13, 2015

(65) Prior Publication Data
US 2017/0103675 A1    Apr. 13, 2017

(51) Int. Cl.
*G09B 19/00*    (2006.01)
(52) U.S. Cl.
CPC ............... *G09B 19/0076* (2013.01)
(58) Field of Classification Search
CPC ................................. G09B 19/0076
USPC ........................................ 434/247
See application file for complete search history.

(56) References Cited

U.S. PATENT DOCUMENTS

| | | |
|---|---|---|
| 3,426,768 A | 2/1969 | Vardaros |
| 4,889,141 A | 12/1989 | Lindsey |
| 5,009,881 A * | 4/1991 | Hill ............ A61K 8/042 424/49 |
| D416,387 S | 11/1999 | Adams |
| 8,038,446 B2 | 10/2011 | Cohen et al. |
| 2009/0202974 A1* | 8/2009 | Sohn ............ G09B 19/0076 434/382 |

FOREIGN PATENT DOCUMENTS

WO    WO2006017720    2/2006

* cited by examiner

*Primary Examiner* — Thomas Hong
*Assistant Examiner* — Jennifer L Korb

(57) ABSTRACT

A child hygiene training device for providing inert hygiene items for use by a child to form good hygiene habits at an early age includes a plurality of hygiene tools. Each of the hygiene tools is configured for use by a child to perform a respective hygienic task. The plurality of hygiene tools includes a mock deodorant comprising inert ingredients configured for safe application to the child while mimicking application of a genuine deodorant.

11 Claims, 1 Drawing Sheet

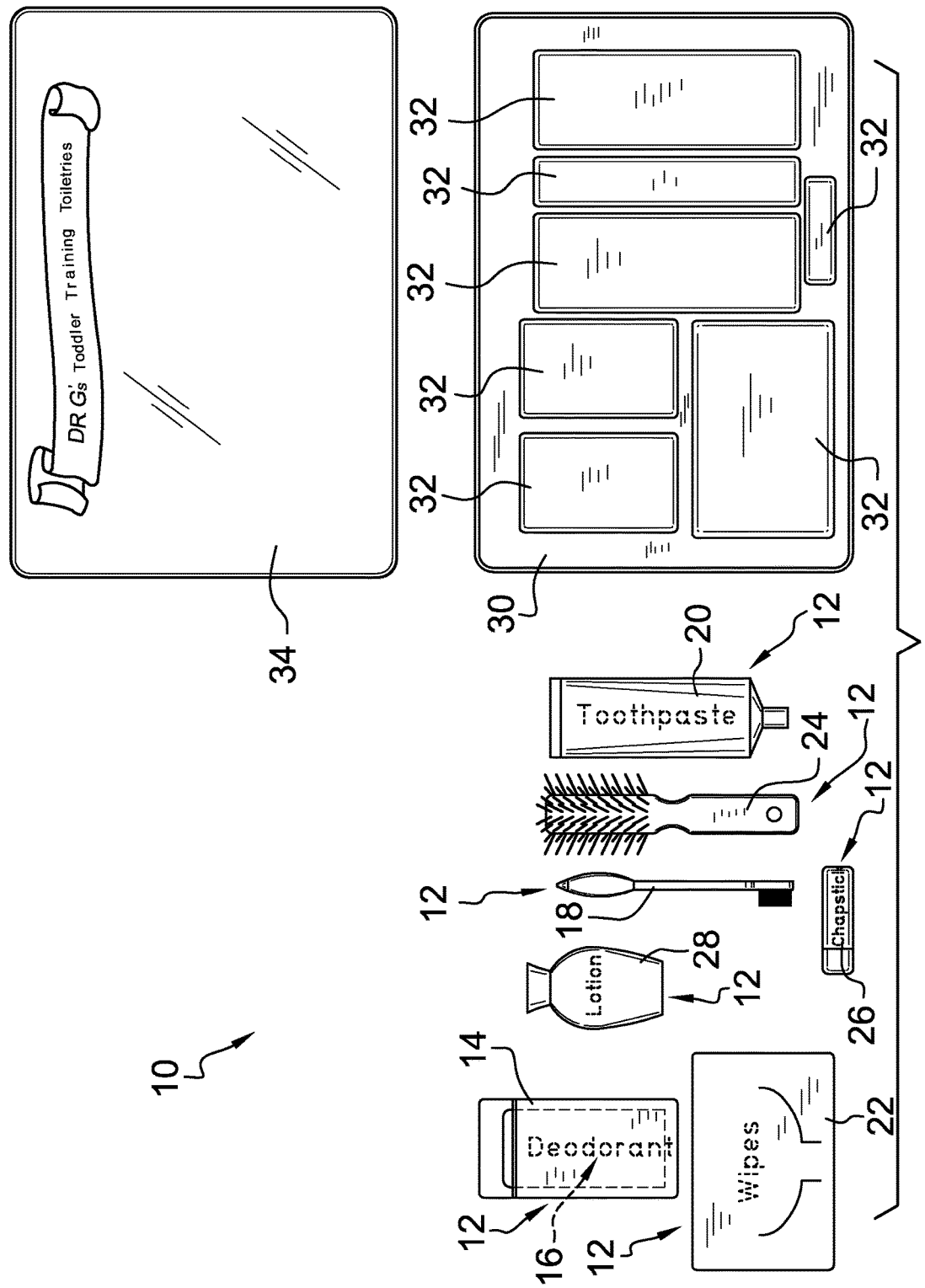

CHILD HYGIENE TRAINING DEVICE

BACKGROUND OF THE DISCLOSURE

Field of the Disclosure

The disclosure relates to training devices and more particularly pertains to a new training device for providing safe and/or inert hygiene items for use by a child to form good hygiene habits at an early age.

SUMMARY OF THE DISCLOSURE

An embodiment of the disclosure meets the needs presented above by generally comprising a plurality of hygiene tools. Each of the hygiene tools is configured for use by a child to perform a respective hygienic task. The plurality of hygiene tools includes a mock deodorant comprising inert ingredients configured for safe application to the child while mimicking application of a genuine deodorant.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 1 is a front view of a child hygiene training device according to an embodiment of the disclosure.

DESCRIPTION OF THE PREFERRED EMBODIMENT

With reference now to the drawing FIG. 1, a new training device embodying the principles and concepts of an embodiment of the disclosure and generally designated by the reference numeral 10 will be described.

As best illustrated in FIG. 1, the child hygiene training device 10 generally comprises a plurality of hygiene tools 12. Each of the hygiene tools 12 is configured for use by a child to perform a respective hygienic task mimicking or using the same procedure for use of the corresponding hygiene tools as would be used as an adolescent or adult. The plurality of hygiene tools 12 includes a mock deodorant 14. The mock deodorant 14 comprises inert ingredients 16 such that the mock deodorant does not provide an actual deodorant effect. Thus, the body of the child is not provided an opportunity to react to application of active ingredients used in conventional deodorant products. The mock deodorant 14 is shown in stick form in FIG. 1 but may be provided in spray form or in the same form as other conventional genuine deodorant products. The mock deodorant 14 is configured for safe application to the child by wiping the mock deodorant 14 on the child or spraying the mock deodorant 14 mimicking application of a genuine deodorant as may be used by an adolescent or adult. As the use would typically be in the same manner, and the mock deodorant 14 is provided with an inert formulation, the mock deodorant 14 is considered representative of an antiperspirant/deodorant product which would be used in the same manner.

The hygiene tools 12 further include a toothbrush 18. The toothbrush 18 is of conventional design but may be provided in a size scaled down for use by a young child such as a toddler. The toothbrush 12 may incorporate conventional dental prophylactic elements as found in conventional toothbrushes. The hygiene tools 12 may also include toothpaste 20. The toothpaste 20 may be provided using inert ingredients wherein the toothpaste 20 is a mock toothpaste that can be used to teach and instill proper dental hygiene habits at an early age. The toothpaste 20 may also be formulated to provide active ingredients conventionally known to be appropriate for a child.

The hygiene tools 12 also include pre-moistened wipes 22 moistened by either conventional fluid formulas appropriate for use by or on a child or using inert fluid allowing a child to safely use the pre-moistened wipe.

The hygiene tools 12 also include a hairbrush 24, a stick lip balm 26, and lotion 28. Each of the stick lip balm 26 and the lotion 28 may be provided with active ingredients conventionally known and used in children's products or may be provided with inert ingredients. The stick lip balm 26 may be unflavored and the lotion 28 can be unscented.

A container 30 is provided and the hygiene tools 12 may be provided with the container 30 in the form of a kit. The container 30 has a plurality of compartments 32. Each of the compartments 32 is shaped to receive and store an associated one of the hygiene tools 12. A lid 37 is couplable to the container 30 wherein the lid 34 covers the compartments 32.

In use, each of the hygiene tools 12 is generally provided as being of the same formulation as genuine hygiene tools of the same character and purpose or slightly altered to be appropriate for use in effective amounts for the child. Alternatively, the hygiene tools, particularly the mock deodorant 14, are provided as a replica of the genuine corresponding apparatus having the same character and method of use, but utilizing inert ingredients such that the hygiene tool 12 is safe for use by the child. Thus, the hygiene tools 12 are designed to allow for training of the child to develop good hygiene habits without potentially exposing the child prematurely to active ingredients in some conventional hygiene products.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A child hygiene training device comprising a plurality of hygiene tools, each of said hygiene tools being configured for use by a child to perform a respective hygienic task, said plurality of hygiene tools including a mock deodorant, said mock deodorant consisting of inert ingredients configured for safe application to the child, wherein application of said mock deodorant is configured to mimic application of a genuine deodorant.

2. The device of claim 1, wherein said plurality of hygiene tools further comprises a toothbrush and a toothpaste.

3. The device of claim 1, wherein said plurality of hygiene tools further comprises pre-moistened wipes.

4. The device of claim 1, wherein said plurality of hygiene tools further comprises a hairbrush.

5. The device of claim 1, wherein said plurality of hygiene tools further comprises a stick lip balm.

6. The device of claim 1, wherein said plurality of hygiene tools further comprises a lotion.

7. The device of claim 6, wherein said lotion is unscented.

8. The device of claim 1, wherein said plurality of hygiene tools further comprises a toothbrush, a toothpaste, pre-moistened wipes, a hairbrush, a stick lip balm, and a lotion, said lotion being unscented.

9. The device of claim 8, further comprising a container, said container having a plurality of compartments, each of said compartments being shaped to receive and store an associated one of said hygiene tools.

10. The device of claim 9, further comprising a lid, said lid being couplable to said container wherein said lid covers said compartments.

11. A child hygiene training device comprising:
 a plurality of hygiene tools, each of said hygiene tools being configured for use by a child to perform a respective hygienic task, said plurality of hygiene tools including:
  a mock deodorant, said mock deodorant consisting of inert ingredients configured for safe application to the child, wherein application of said mock deodorant is configured to mimic application of a genuine deodorant;
  a toothbrush;
  a toothpaste;
  pre-moistened wipes;
  a hairbrush;
  a stick lip balm; and
  a lotion, said lotion being unscented;
 a container, said container having a plurality of compartments, each of said compartments being shaped to receive and store an associated one of said hygiene tools; and
 a lid, said lid being couplable to said container wherein said lid covers said compartments.

* * * * *